(12) United States Patent
Xu et al.

(10) Patent No.: US 11,909,999 B2
(45) Date of Patent: Feb. 20, 2024

(54) CODING MANAGEMENT METHOD AND APPARATUS BASED ON HIGH EFFICIENCY VIDEO CODING

(71) Applicant: SANECHIPS TECHNOLOGY CO., LTD., Shenzhen (CN)

(72) Inventors: Ke Xu, Shenzhen (CN); Jianjun Song, Shenzhen (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 219 days.

(21) Appl. No.: 17/601,848

(22) PCT Filed: Apr. 20, 2020

(86) PCT No.: PCT/CN2020/085642
§ 371 (c)(1),
(2) Date: Oct. 6, 2021

(87) PCT Pub. No.: WO2020/248715
PCT Pub. Date: Dec. 17, 2020

(65) Prior Publication Data
US 2022/0210459 A1    Jun. 30, 2022

(30) Foreign Application Priority Data

Jun. 13, 2019   (CN) .......................... 201910512079.9

(51) Int. Cl.
*H04N 19/50* (2014.01)
*H04N 19/119* (2014.01)
(Continued)

(52) U.S. Cl.
CPC .......... *H04N 19/50* (2014.11); *H04N 19/119* (2014.11); *H04N 19/159* (2014.11); *H04N 19/70* (2014.11)

(58) Field of Classification Search
CPC .. H04N 19/119; H04N 19/159; H04N 19/176; H04N 19/50; H04N 19/70;
(Continued)

(56) References Cited

U.S. PATENT DOCUMENTS

| 2015/0010069 A1 | 1/2015 | Guignard et al. | |
| 2017/0244964 A1* | 8/2017 | Liu | H04N 19/119 |
| 2021/0168408 A1* | 6/2021 | Malakhov | H04N 19/167 |

FOREIGN PATENT DOCUMENTS

| CN | 104602017 A | 5/2015 |
| CN | 104902276 A | 9/2015 |

(Continued)

OTHER PUBLICATIONS

International Searching Authority. International Search Report and Written Opinion for PCT Application No. PCT/CN2020/085642 and English translation, dated Jul. 16, 2020, pp. 1-12.

*Primary Examiner* — Behrooz M Senfi
(74) *Attorney, Agent, or Firm* — Vivacqua Crane, PLLC (57) ABSTRACT

Disclosed are a coding management method and apparatus based on High Efficiency Video Coding (HEVC). The method includes: obtaining a calculated correlation result for a HEVC basic unit before and after division, the correlation result including a spatial correlation result for the basic unit before the division and N basic units generated after the division, and N being an integer greater than 1; and judging whether or not to perform the division on the basic unit according to the calculated correlation result.

18 Claims, 3 Drawing Sheets

---

Obtain a calculated correlation result for a HEVC basic unit before and after division, where the correlation result includes a spatial correlation result for the basic unit before the division and N basic units generated after the division, and N is an integer greater than 1   — 1010

Judge whether or not to perform the division on the basic unit according to the calculated correlation result   — 1020

(51) Int. Cl.
*H04N 19/159* (2014.01)
*H04N 19/70* (2014.01)

(58) Field of Classification Search
CPC .... H04N 19/103; H04N 19/137; H04N 19/14;
H04N 19/44; H04N 19/61
USPC .................................................. 375/240.02
See application file for complete search history.

(56) References Cited

FOREIGN PATENT DOCUMENTS

| | | | | | |
|---|---|---|---|---|---|
| CN | 105721870 | A | * | 6/2016 | ........... H04N 19/139 |
| CN | 105721870 | A | | 6/2016 | |
| CN | 106358033 | A | * | 1/2017 | ............ H04N 13/00 |
| CN | 107566834 | A | | 1/2018 | |
| CN | 108322747 | A | | 7/2018 | |
| CN | 108713320 | A | | 10/2018 | |
| CN | 108495129 | B | * | 3/2019 | ........... H04N 19/103 |
| CN | 109688414 | A | | 4/2019 | |

\* cited by examiner

CODING MANAGEMENT METHOD AND APPARATUS BASED ON HIGH EFFICIENCY VIDEO CODING

CROSS-REFERENCE TO RELATED APPLICATION

This application is a national stage filing under 35 U.S.C. § 371 of international application number PCT/CN2020/085642, filed Apr. 20, 2020, which claims priority to Chinese patent application No. 201910512079.9, filed Jun. 13, 2019. The contents of these applications are incorporated herein by reference in their entirety.

TECHNICAL FIELD

The present application relates to the field of information processing, and in particular to a coding management method and device based on high efficiency video coding.

BACKGROUND

With the rapid development of the video industry, the video resolution has been increased from standard definition, high definition and super definition to 4K/8K, and the frames per second (FPS) has been increased from 30 frames, 60 frames and 90 frames to 120 frames, so the amount of information contained is constantly increasing. This will inevitably bring great pressure to network bandwidth, so how to improve the coding quality of video code streams is very important.

In order to better improve the coding quality, the international organization for video coding standards put forward the High Efficiency Video Coding (HEVC) standard (also called H.265), which introduces a coding tree unit (CTU) and uses an image block division method based on a quadtree structure. Compared with H.264/AVC (Advanced Video Coding), the image block division method can achieve better coding efficiency. However, as it is required to optimally divide coding units (CUs), prediction units (PUs) and transform units (TUs) of all sizes by calculating costs via rate-distortion optimization (RDO), the complexity of a coder is very high.

SUMMARY

The present application provides a coding management method and device based on high efficiency video coding, which can decrease the complexity of a coder.

The present application provides a coding management method based on high efficiency video coding (HEVC), including:

obtaining a calculated correlation result for a HEVC basic unit before and after division, the correlation result including a spatial correlation result for the basic unit before the division and N basic units generated after the division, and N being an integer greater than 1; and judging whether or not to perform the division on the basic unit according to the calculated correlation result.

The present application further provides a coding management device based on HEVC, including a processor and a memory. The memory stores a computer program which, when called by the processor, causes the processor to perform the aforementioned coding management method based on HEVC.

DETAILED DESCRIPTION

Embodiments of the present application will be described hereinafter with reference to the drawings.

The steps shown in the flowcharts of the drawings may be executed in a computer system such as a set of computer-executable instructions. Moreover, although logical sequences are shown in the flowcharts, in some cases, the steps shown or described may be executed in sequences different from here.

Taking CU as an example, the technical schemes of the present application will be analyzed and described.

In HEVC, sizes of coding blocks (CBs) range from 8×8 to 64×64. On the one hand, large CBs can enable the efficiency of coding of a flat region to be increased greatly, and on the other hand, small CBs can enable local details of an image to be processed well, thus making the prediction of a complex image more accurate. A coding unit (CU) consists of a brightness component CB, a corresponding chromaticity component CB and related syntax elements.

An image may be divided into a plurality of CTUs which do not overlap with one another. In a CTU, a quadtree-based circular hierarchical structure is used. Coding units on the same hierarchy have equal split depths. A CTU may include only one CU (i.e. not divided), or may be divided into a plurality of CUs.

Whether or not a coding unit is to be further divided depends on a split flag. For a coding unit CU d, if it has a size of 2N×2N, a depth of d and a value of the corresponding split flag of 0, then the CU d is no longer subjected to quadtree division. Otherwise, if the value of the corresponding split flag is 1, the coding unit CU d will be divided into four independent coding units CUs d+1.

The value of the split flag is determined by calculating rate distortion costs of the current CU d and the four sub-CUs d+1 generated after the division. If a best mode cost of the current CU d is Best Cost d, a sum of best mode costs of the four sub-CUs d+1 generated after the division is Best Cost d+1. If Best Cost d is less than or equal to Best Cost d+1, then the current CU d will not be divided, and the corresponding split flag is equal to 0. Otherwise, if Best Cost d is greater than Best Cost d+1, then the current CU d will be divided, and the corresponding split flag is equal to 1.

In HEVC, the intra-frame prediction supports CUs of four sizes: 8×8, 16×16, 32×32 and 64×64, and a PU corresponding to a CU of each size has 35 prediction modes. The inter-frame prediction is performed through motion search based on block motion compensation. Both types of prediction are the most time-consuming modules at a coding end as well as necessary modules for the calculation of a best mode. In the process of CU division, each time when judging whether or not to perform the division, 4+1 searches in intra-frame and inter-frame modes have to be performed, so the complexity of calculation is very high.

The purpose of analyzing the CU division is to differentiate complexities of textures of different local regions of an image, and respectively use CBs of different sizes for coding according to the complexities of the textures of the different local regions of the image. For the intra-frame mode, the more complex a texture of a coding block, the greater the change of pixel values and the smaller the CU tends to be divided. Otherwise, the smoother a coding block, the smaller the change of pixel values and the larger the CU tends to be divided. For the inter-frame mode, the less a correlation between a current frame region of a coding block and a reference frame region, the greater the difference of pixel values and the smaller the CU tends to be divided. Otherwise, the greater a correlation between a current frame region of a coding block and a reference frame region, the smaller the difference of pixel values and the larger the CU tends to be divided.

In the process of coding, some advanced CU division decision algorithms are contained in an HEVC standard testing platform, e.g. Early CU strategy, Early SKIP strategy and fast coding block flag (CBF Fast) strategy. All these conditions and requirements are strict, so the decrease of complexity is limited. On this basis, according to the embodiments of the present application, simple preprocessing is performed before the CU division to judge the basic condition (spatial correlation degree in the intra-frame mode and temporal correlation degree in the inter-frame mode) of a current CU block, and whether or not to perform the division is then judged according to these information, i.e. adding a CU division decision condition. Therefore, if a CU division method can be predicted in advance, then some nodes in a quadtree can be effectively skipped directly, and thus, the complexity of a coder can be significantly decreased.

Figure 1:
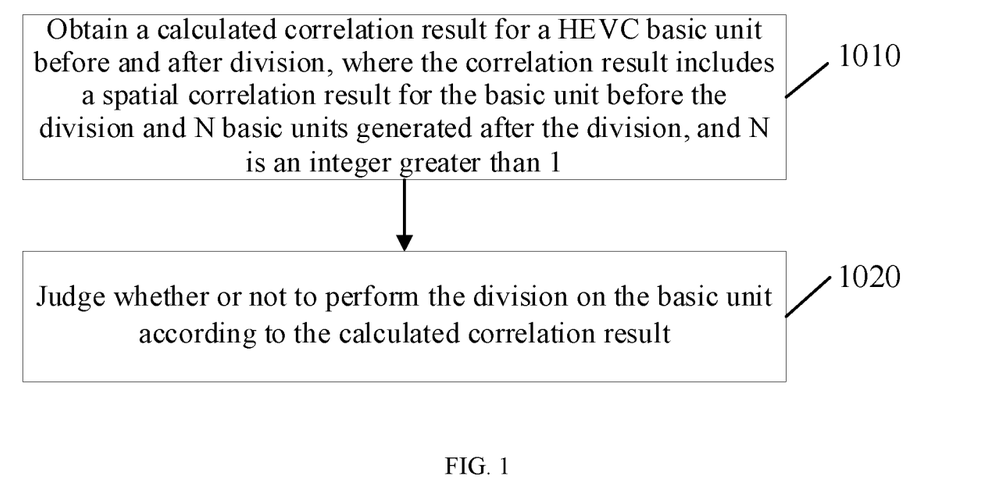
FIG. 1 is a flowchart of a coding management method based on high efficiency video coding according to an embodiment of the present application.

FIG. 1 is a flowchart of a coding management method based on high efficiency video coding according to the embodiments of the present application. The method shown in FIG. 1 includes the following steps S1010 to S1020.

In a step of S1010, a calculated correlation result for a HEVC basic unit before and after division is obtained, the correlation result includes a spatial correlation result for the basic unit before the division and N basic units generated after the division, and N is an integer greater than 1.

In an example embodiment, the basic unit may be a coding unit (CU), a prediction unit (PU) or a transform unit (TU).

In an example embodiment, the spatial correlation result includes: spatial correlation $\alpha_s$ between the basic unit before the division and the N basic units generated after the division; and/or spatial correlation $\beta_s$ between the N basic units generated after the division of the basic unit.

In a step of S1020, whether or not to perform the division on the basic unit is judged according to the calculated correlation result.

Different from the division decision condition in the existing technology, the decision condition provided by the embodiment of the present application is that a cost relationship of the division is determined according to correlation for a basic unit before and after division, so as to determine whether or not to perform the division. The required calculation is the calculation of the correlation result, so the method decreases the complexity of calculation in comparison with the existing technology.

By obtaining a calculated correlation result for a HEVC basic unit before and after division, and judging whether or not to perform the division on the basic unit according to the calculated correlation result, the method provided by the embodiment of the present application decreases the complexity of the judgment by using the correlation result for the basic unit before and after division as a division decision condition.

The method provided by the embodiment of the present application will be described below.

In an example embodiment, the spatial correlation $\alpha_s$ between a basic unit before the division and N basic units generated after the division is obtained by the following formula:

$$\alpha_s = \frac{N * D(X)^d}{D(X)_1^{d+1} + D(X)_2^{d+1} + D(X)_3^{d+1} + \ldots + D(X)_N^{d+1}};$$

where N denotes a total number of the basic units generated after the division; d denotes a depth before the division of the basic unit; d+1 denotes a depth after the division of the basic unit; $D(X)^d$ denotes a spatial correlation degree before the division of the basic unit; and $D(X)_i^{d+1}$ denotes a spatial correlation degree of the ith basic unit generated after the division of the basic unit, where i=1, 2, 3, . . . , N.

In an example embodiment, the spatial correlation $\beta_s$ between the N basic units generated after the division of the basic unit is obtained by the following formula:

$$\beta_s = \frac{\max(D(X)_1^{d+1}, D(X)_2^{d+1}, D(X)_3^{d+1}, \ldots, D(X)_N^{d+1})}{\min(D(X)_1^{d+1}, D(X)_2^{d+1}, D(X)_3^{d+1}, \ldots, D(X)_N^{d+1})};$$

where N denotes a total number of the basic units generated after the division; d denotes a depth before the division of the basic unit; d+1 denotes a depth after the division of the basic unit; $D(X)^d$ denotes a spatial correlation degree before the division of the basic unit; and $D(X)_i^{d+1}$ denotes a spatial correlation degree of the ith basic unit generated after the division of the basic unit, where i=1, 2, 3, . . . , N.

In an example embodiment, the calculated correlation result further includes a temporal correlation result between the basic unit before the division and the N basic units generated after the division.

In the present example embodiment, after an intra-frame mode of the basic unit is determined through the spatial correlation, an inter-frame mode of the basic unit is then determined through the temporal correlation, so as to judge the division of the basic unit.

In an example embodiment, the temporal correlation result is obtained by the following method, including:

temporal correlation $\alpha_t$ between the basic unit before the division and the N basic units generated after the division; and/or temporal correlation $\beta_t$ between the N basic units generated after the division of the basic unit.

In an example embodiment, the temporal correlation $\alpha_t$ between the basic unit before the division and the N basic units generated after the division is obtained by the following formula:

$$\alpha_t = \frac{N * D(Y)^d}{D(Y)_1^{d+1} + D(Y)_2^{d+1} + D(Y)_3^{d+1} + \ldots + D(Y)_N^{d+1}};$$

where N denotes a total number of the basic units generated after the division; d denotes a depth before the division of the basic unit; d+1 denotes a depth after the division of the basic unit; $D(Y)^d$ denotes a temporal correlation degree before the division of the basic unit; and $D(Y)_i^{d+1}$ denotes a temporal correlation degree of the ith basic unit generated after the division of the basic unit, where i=1, 2, 3, . . . , N.

In an example embodiment, the temporal correlation $\beta_t$ between the N basic units generated after the division of the basic unit is obtained by the following formula:

$$\beta_t = \frac{\max(D(Y)_1^{d+1}, D(Y)_2^{d+1}, D(Y)_3^{d+1}, \ldots, D(Y)_N^{d+1})}{\min(D(Y)_1^{d+1}, D(Y)_2^{d+1}, D(Y)_3^{d+1}, \ldots, D(Y)_N^{d+1})};$$

where N denotes a total number of the basic units generated after the division; d denotes a depth before the division of the basic unit; d+1 denotes a depth after the division of the basic unit; $D(Y)^d$ denotes a temporal correlation degree before the division of the basic unit; and $D(Y)_i^{d+1}$ denotes a temporal correlation degree of the ith basic unit generated after the division of the basic unit, where i=1, 2, 3, . . . , N.

In an example embodiment, the judging whether or not to perform the division on the basic unit according to the calculated correlation result includes:

acquiring a video frame type corresponding to the basic unit; if the basic unit is an intra-frame video frame, then judging whether or not to perform the division on the basic unit according to the spatial correlation result; or if the basic unit is an unidirectionally predictively coded frame or a bidirectionally predictively coded frame, then judging whether or not to perform the division on the basic unit according to the spatial correlation result and the temporal correlation result.

In the present example embodiment, by identifying the video frame type corresponding to the basic unit and determining the correlation result required to be used, the scale of correlation calculation can be effectively controlled under the premise of ensuring the implementation of division.

In an example embodiment, the judging whether or not to perform the division on the basic unit according to the calculated correlation result includes:

judging whether or not to perform the division on the basic unit according to the spatial correlation result before the division of the basic unit if the basic unit is an intra-frame video frames (I frame); or judging whether or not to perform the division on the basic unit according to the spatial correlation result and the temporal correlation result before the division of the basic unit if the basic unit is an unidirectionally predictively coded frame or a bidirectionally predictively coded frame (P frame or B frame).

In the present example embodiment, by comparing values of the current spatial or temporal correlations of the basic units and using the obtained correlation results before and after the division as a division decision condition, the accuracy of the judgment can be effectively increased.

In an example embodiment, after the judging whether or not to perform the division on the basic unit according to the calculated correlation result, the method further includes:

collecting statistics on the correlation result of the basic unit undergoing the division and the correlation result of the basic unit not undergoing the division after a result of judging whether or not to perform the division on the basic unit is obtained; and determining a threshold used in an execution of a next judgment on whether or not to perform the division on the basic unit according to the correlation result of the basic unit undergoing the division and the correlation result of the basic unit not undergoing division, the threshold including a threshold for performing the division and/or a threshold for not performing the division.

In the present example embodiment, the threshold may be recalculated at intervals or when the application scenario is changed, so that judgment can be accurately performed.

In an example embodiment, after the judging whether or not to perform the division on the basic unit according to the calculated correlation result, the method further includes:

calculating residual information of the basic unit after determining not to perform the division on the basic unit; and performing the division on the basic unit when the obtained residual information meets a preset residual judgment condition.

In the present example embodiment, for the basic unit judged not to undergo the division, residual of the basic unit is calculated before determining whether or not to perform the division, so that the accuracy of coding can be increased.

The method provided by the embodiments of the present application will be described hereinafter.

Example Embodiment One

An application scenario of dividing a CU d into four sub-CUs d+1 with Best Cost d as a best mode cost is taken as an example for description.

In the existing technology, the CU division method leads to the high complexity of calculation at a coding end in the process of coding.

The example embodiment of the present application proposes a coding method for fast deep CU division based on HEVC correlation information. Before the CU d is divided, preprocessing is first performed to obtain spatial correlation and temporal correlation information of the CU d, and then spatial correlation and temporal correlation information of the CUs d+1 generated after the division is obtained, a cost relationship between the two is established, and a CU division decision is made in advance. Thus, correlations of a video content can be sufficiently utilized, and the complexity of coding is decreased.

Figure 2:
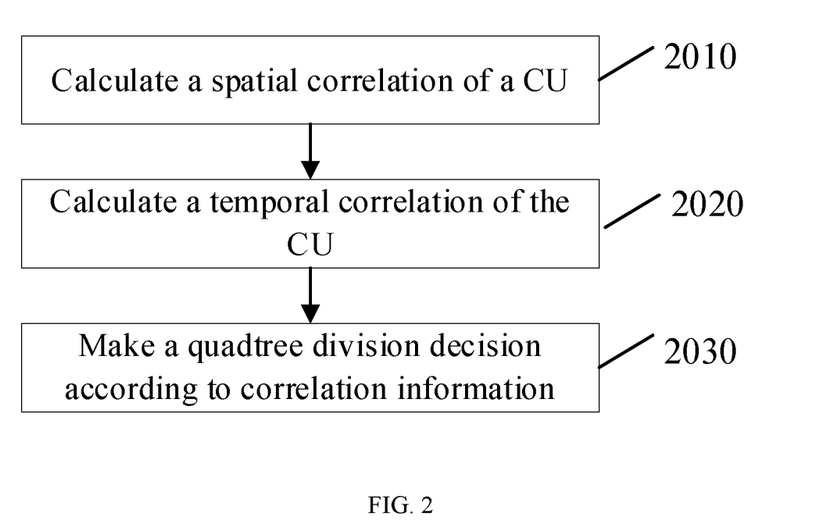
FIG. 2 is a flowchart of a coding management method for deep CU division according to embodiment one of the present application.

FIG. 2 is a flowchart of a coding management method for deep CU division according to embodiment one of the present application. The method shown in FIG. 2 includes the following steps S2010 to S2030.

In a step of S2010, a spatial correlation of a CU is calculated.

A spatial correlation of a current CU is obtained, and spatial correlation degrees of the coding unit before the CU division and four coding units generated after the division are calculated.

In a step of S2020, a temporal correlation of the CU is calculated.

A temporal correlation of the current CU is obtained, and temporal correlation degrees of the coding unit before the CU division and four coding units generated after the division are calculated.

In a step of S2030, a quadtree division decision is made according to the correlation information.

The judging whether or not to perform division on the current CU includes:

For an I frame, only the spatial correlation is required for a judgment. That is, if the correlation before the division is greater than that after the division, then the division will not be performed; and if the correlation before the division is not greater than that after the division, then it is determined to perform division on the basic unit.

For a P/B frame, if both the spatial correlation and the temporal correlation meet the condition that the correlation before the division is greater than that after the division, then the division will not be performed; and if neither the spatial correlation nor the temporal correlation meets the condition that the correlation before the division is greater than that after the division, then it is determined to perform division on the basic unit.

The method provided by embodiment one of the present application can increase the speed of video image coding.

Example Embodiment Two

An application scenario of processing a CU d with an HEVC Test Model (HM) coder and an IPPP coding structure is taken as an example for description.

Figure 3:
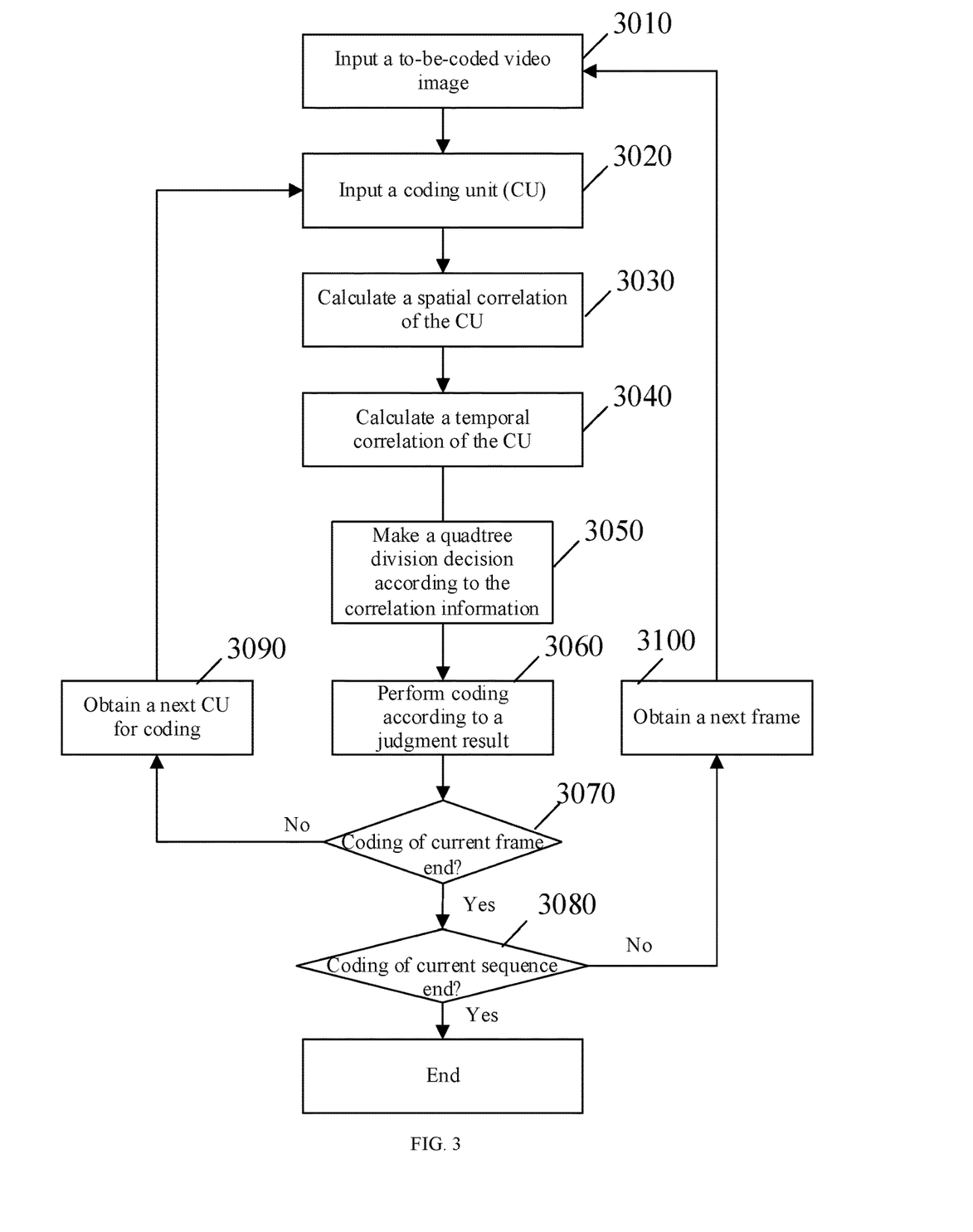
FIG. 3 is a flowchart of a frame coding method for deep CU division according to embodiment two of the present application.

FIG. 3 is a flowchart of a frame coding management method for deep CU division according to embodiment two of the present application. The method shown in FIG. 3 includes the following steps S3010 to S3100.

In a step of S3010, a to-be-coded video image is input.

The video image is a video image to be coded, and may be a video sequence.

In a step of S3020, a coding unit is input as a to-be-processed object for division decision.

In a step of S3030, a spatial correlation of the CU is calculated.

Firstly, spatial correlation degrees of the coding unit before the CU division and four coding units generated after the division are defined, and a spatial correlation is defined with a variance in the coding unit.

Then, the spatial correlation degree of the coding unit with a depth of d before the CU division is calculated. An average value is calculated, as shown in formula (1).

$$E(X) = \frac{1}{n}\sum_{i=1}^{n} x_i \qquad (1)$$

where n denotes the number of pixels contained in the coding unit, and $x_i$ denotes a pixel value of the ith pixel. A variance is calculated, as shown in formula (2).

$$D(X) = \frac{1}{n}\sum_{i=1}^{n}(x_i - E(X))^2 \qquad (2)$$

Thus, the spatial correlation degree of the current CU is obtained, which is denoted by $D(X)^{CU=d}$. According to the same method, the spatial correlation degrees of the four coding units generated after the division are calculated, which are denoted by $D(X)_1^{CU=d+1}$, $D(X)_2^{CU=d+1}$, $D(X)_3^{CU=d+1}$ and $D(X)_4^{CU=d+1}$ respectively. Perceptive factors of two spatial correlations are defined, as shown in formulas (3) and (4).

$$\alpha_d^I = \frac{4*D(X)^{CU=d}}{D(X)_1^{CU=d+1} + D(X)_2^{CU=d+1} + D(X)_3^{CU=d+1} + D(X)_4^{CU=d+1}} \qquad (3)$$

$$\beta_d^I = \frac{\max(D(X)_1^{CU=d+1}, D(X)_2^{CU=d+1}, D(X)_3^{CU=d+1}, D(X)_3^{CU=d+1})}{\min(D(X)_1^{CU=d+1}, D(X)_2^{CU=d+1}, D(X)_3^{CU=d+1}, D(X)_4^{CU=d+1})} \qquad (4)$$

where $\alpha_d^I$ denotes a correlation degree between the CU d before the division and the four CUs d+1 generated after the division, and the smaller the value, the greater the correlation in the CU d; and $\beta_d^I$ denotes a correlation degree between the four CUs d+1 generated after the division, and the smaller the value, the greater the correlation between the sub-CUs d+1.

In a step of S3040, a temporal correlation of the CU is calculated.

Firstly, temporal correlation degrees of a coding unit before the CU division and four coding units generated after the division are defined, and a temporal correlation is defined with a variance between the coding unit and a reference unit.

Then, the temporal correlation degree of the coding unit with a depth of d before the CU division is calculated. The obtainment of the reference unit is similar to that of a merge spatial candidate list in the motion vector (MV) prediction technique. A motion vector prediction (MVP) value with the highest priority is obtained according to the spatial information of the current coding unit and then rounded off, and integer-pixel shift is performed in a region corresponding to a reference frame, so that the reference unit is obtained.

The variance between the coding unit and the reference unit is calculated, as shown in formula (5).

$$D(Y) = \frac{1}{n}\sum_{i=1}^{n}(y_i^c - y_i^r)^2 \qquad (5)$$

where n denotes the number of pixels contained in the coding unit, $y_i^c$ denotes a pixel value of the coding unit, and $y_i^r$ denotes a pixel value of the reference unit. The temporal correlation degree of the current CU is obtained, which is denoted by $D(Y)^{CU=d}$. According to the same method, the temporal correlation degrees of the four coding units generated after the division are calculated, which are denoted by $D(Y)_1^{CU=d+1}$, $D(Y)_2^{CU=d+1}$, $D(Y)_3^{CU=d+1}$ and $D(Y)_4^{CU=d+1}$ respectively. Perceptive factors of two temporal correlations are defined, as shown in formulas (6) and (7).

$$\alpha_d^P = \frac{4*D(Y)^{CU=d}}{D(Y)_1^{CU=d+1} + D(Y)_2^{CU=d+1} + D(Y)_3^{CU=d+1} + D(Y)_4^{CU=d+1}} \qquad (6)$$

$$\beta_d^P = \frac{\max(D(Y)_1^{CU=d+1}, D(Y)_2^{CU=d+1}, D(Y)_3^{CU=d+1}, D(Y)_4^{CU=d+1})}{\min(D(Y)_1^{CU=d+1}, D(Y)_2^{CU=d+1}, D(Y)_3^{CU=d+1}, D(Y)_4^{CU=d+1})} \qquad (7)$$

where $\alpha_d^P$ denotes a correlation degree between the CU d before the division and the four CUs d+1 generated after the division, and the smaller the value, the greater the correlation in the CU d; $\beta_d^P$ denotes a correlation degree between the four CUs d+1 generated after the division, and the smaller the value, the greater the correlation between the sub-CUs d+1.

In a step of S3050, a quadtree division is performed according to the correlation information.

A judgment is made based on the spatial and temporal correlations of the current coding unit obtained in step S3030 and step S3040, including:

for an I frame, only the spatial correlation is required for the judgment; and for a P/B frame, the judgment is made according to the spatial correlation and the temporal correlation.

$$\alpha_d^I < \alpha_d^{I1}, \beta_d^I < \beta_d^{I1},$$

$$\alpha_d^P < \alpha_d^{P1}, \beta_d^P < \beta_d^{P1}, \qquad (8a)$$

$$\alpha_d^I > \alpha_d^{I2}, \beta_d^I > \beta_d^{I2},$$

$$\alpha_d^P > \alpha_d^{P2}, \gamma_d^P > \beta_d^{P2}, \quad (9a)$$

If formula (8a) is met, the CU will not be divided, and if formula (9a) is met, the CU will be divided. $\alpha_d^{I1}, \beta_d^{I1}, \gamma_d^{I1}, \alpha_d^{P1}, \beta_d^{P1}, \gamma_d^{P1}, \alpha_d^{I2}, \beta_d^{I2}, \gamma_d^{I1}, \alpha_d^{P2}, \beta_d^{P2}$ and $\gamma_d^{P2}$ here are all thresholds which may be different. The first six symbols denote the thresholds for not performing division, and are marked with data 1, and the last six symbols denote the thresholds for performing division, and are marked with data 2.

In a step of S3060, coding is performed according to a judgment result.

In a step of S3070, whether or not the coding of the current frame ends is judged.

If the coding of the current frame ends, then step S3080 is executed. If the coding of the current frame does not end, then step S3090 is executed to obtain a next CU.

In a step of S3080, whether or not the coding of the current sequence ends is judged.

If the coding of the current sequence ends, then the flow ends. If the coding of the current sequence does not end, then step S3100 is executed to obtain a next video frame.

Example Embodiment Three

An application scenario of processing a CU d with an HM coder and an IPPP coding structure is taken as an example for description.

Figure 4:
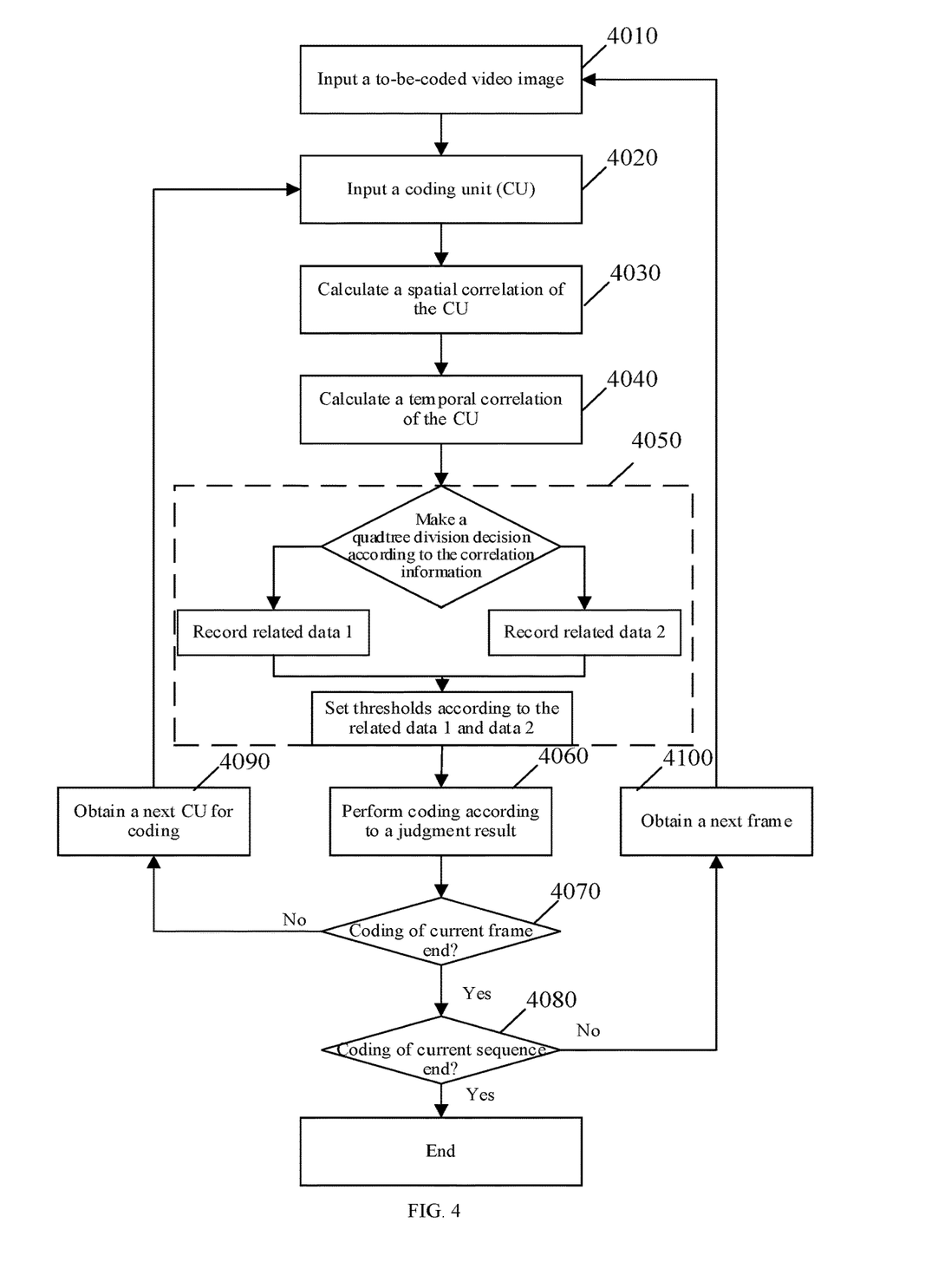
FIG. 4 is a flowchart of a management method for deep CU division based on threshold training according to embodiment three of the present application.

FIG. 4 is a flowchart of a management method for deep CU division based on threshold training according to embodiment three of the present application. The method shown in FIG. 4 includes the following steps S4010 to S4100.

In a step of S4010, a to-be-coded video image is input.

The video image is a video image to be coded, and may be a video sequence.

In a step of S4020, a coding unit is input as a to-be-processed object for division decision.

In a step of S4030, a spatial correlation of the CU is calculated.

Firstly, spatial correlation degrees of the coding unit before the CU division and four coding units generated after the division are defined, and a spatial correlation is defined with a variance in the coding unit.

Then, the spatial correlation degree of the coding unit with a depth of d before the CU division is calculated. An average value is calculated, as shown in formula (1).

In formula (1), n denotes the number of pixels contained in the coding unit, and xi denotes a pixel value of the ith pixel. A variance is calculated, as shown in formula (2).

Thus, the spatial correlation degree of the current CU is obtained, which is denoted by $D(X)^{CU=d}$. According to the same method, the spatial correlation degrees of the four coding units generated after the division are calculated, which are denoted by $D(X)_1^{CU=d+1}$, $D(X)_2^{CU=d+1}$, $D(X)_3^{CU=d+1}$ and $D(X)_4^{CU=d+1}$ respectively. Perceptive factors of two spatial correlations are defined, as shown in formulas (3) and (4).

In formulas (3) and (4), $\alpha_d^I$ denotes a correlation degree between the CU d before the division and the four CUs d+1 generated after the division, and the smaller the value, the greater the correlation in the CU d; $\beta_d^I$ denotes a correlation degree between the four CUs d+1 generated after the division, and the smaller the value, the greater the correlation between the sub-CUs d+1.

In a step of S4040, a temporal correlation of the CU is calculated.

Firstly, temporal correlation degrees of a coding unit before the CU division and four coding units generated after the division are defined, and a temporal correlation is defined with a variance between the coding unit and a reference unit.

Then, the temporal correlation degree of the coding unit with a depth of d before the CU division is calculated. The obtainment of the reference unit is similar to that of a merge spatial candidate list in the motion vector (MV) prediction technique. An MVP value with the highest priority is obtained according to the spatial information of the current coding unit and then rounded off, and integer-pixel shift is performed in a region corresponding to a reference frame, so that the reference unit is obtained.

The variance between the coding unit and the reference unit is calculated, as shown in formula (5).

In formula (5), n denotes the number of pixels contained in the coding unit, $y_i^c$ denotes a pixel value of the coding unit, and $y_i^r$ denotes a pixel value of the reference unit. The temporal correlation degree of the current CU is obtained, which is denoted by $D(Y)^{CU=d}$. According to the same method, the temporal correlation degrees of the four coding units generated after the division are calculated, which are denoted by $D(Y)_1^{CU=d+1}$, $D(Y)_2^{CU=d+1}$, $D(Y)_3^{CU=d+1}$ and $D(Y)_4^{CU=d+1}$ respectively. Perceptive factors of two temporal correlations are defined, as shown in formulas (6) and (7).

In formulas (6) and (7), $\alpha_d^P$ denotes a correlation degree between the CU d before the division and the four CUs d+1 generated after the division, and the smaller the value, the greater the correlation in the CU d; $\beta_d^P$ denotes a correlation degree between the four CUs d+1 generated after the division, and the smaller the value, the greater the correlation between the sub-CUs d+1.

In a step of S4050, a quadtree division is performed according to the correlation information.

A judgment is made based on the spatial and temporal correlations of the current coding unit obtained in step S4030 and step S4040, including:

For an I frame, only the spatial correlation is required for the judgment.

For a P/B frame, the judgment is made according to the spatial correlation and the temporal correlation.

In order to prevent the occurrence of an extreme condition, when a division decision is made for the CU with a depth of d, limitations are separately added to the correlation degrees of the CU, as shown in formulas (8b) and (9b).

$$\alpha_d^I < \alpha_d^{I1}, \beta_d^I < \beta_d^{I1}, D(X)^{CU=d} < \gamma_d^{I1},$$

$$\alpha_d^P < \alpha_d^{P1}, \beta_d^P < \beta_d^{P1}, D(Y)^{CU=d} < \gamma_d^{P1}, \quad (8b)$$

$$\alpha_d^I > \alpha_d^{I2}, \beta_d^I > \beta_d^{I2}, D(X)^{CU=d} < \gamma_d^{I2},$$

$$\alpha_d^P > \alpha_d^{P2}, \gamma_d^P > \beta_d^{P2}, D(Y)^{CU=d} < \gamma_d^{P2}, \quad (9b)$$

If formula (8b) is met, then the CU will not be divided. If formula (9b) is met, then the CU will be divided. $\alpha_d^{I1}$, $\beta_d^{I1}$, $\gamma_d^{I1}$, $\alpha_d^{P1}$, $\beta_d^{P1}$, $\gamma_d^{P1}$, $\alpha_d^{I2}$, $\beta_d^{I2}$, $\gamma_d^{I1}$, $\alpha_d^{P2}$, $\beta_d^{P2}$ and $\gamma_d^{P2}$ here are all thresholds which may be different. The first six symbols denote the thresholds for not performing division, and are marked with data 1, and the last six symbols denote the thresholds for performing division, and are marked with data 2.

Next, there will be two processes, one of which is a threshold training process and the other of which is a coding process.

In order to obtain these twelve thresholds, a training process is required to be executed. The training process is started with N (e.g. 100) frames of images. According to a conventional CU division flow, when the depth is d and the CU will not be divided, statistics on distributions of $\alpha_d^{J1}$, $\beta_d^{J1}$, $\gamma_d^{J1}$, $\alpha_d^{P1}$, $\beta_d^{P1}$ and $\gamma_d^{P1}$ marked with data 1 are respectively collected, and as long as formula (8b) is met in most (e.g. 80%) cases, the corresponding thresholds are obtained; when the depth is d and the CU will be divided, statistics on distributions of $\alpha_d^{J2}$, $\beta_d^{J2}$, $\gamma_d^{J1}$, $\alpha_d^{P2}$, $\beta_d^{P2}$ and $\gamma_d^{P2}$ marked with data 2 are respectively collected, and as long as formula (9b) is met in most (e.g. 80%) cases, the corresponding thresholds are obtained.

Next, in the coding process, updating may be performed at intervals or when the scenario is changed, the aforementioned method may be used to make division decisions for CUs with different depths din the other periods of time, and thereby, coding time can be saved. In addition, in order to prevent the occurrence of an extreme condition, if the CU will not be divided, a residual of the current coding unit may also be judged, and if an oversize code word appears, the division is forcibly performed.

In a step of S4060, coding is performed according to a judgment result.

In a step of S4070, whether or not the coding of the current frame ends is judged.

If the coding of the current frame ends, then step S4080 is executed. If the coding of the current frame does not end, then step S4090 is executed to obtain a next CU.

In a step of S4080, whether or not the coding of the current sequence ends is judged.

If the coding of the current sequence ends, then the flow ends. If the coding of the current sequence does not end, then step S4100 is executed to obtain a next video frame.

In the aforementioned example embodiment one to example embodiment three, the correlation calculation method is not limited to variance, but may also be based on a combination of one or more of standard deviation, covariance, Hadamard transform coefficient size, sine/cosine transform size of residual coefficient, Sobel gradient size, and the like.

The correlation information, which is not limited to the first step and second step of the aforementioned flow, may be directly obtained from the pixel value sample training of the coding units by using deep learning or machine learning.

The CU division decision may also be extended to PU and TU division decisions.

The pixel value may be a Y brightness component, a UN chromaticity component, or combination thereof.

The training process for obtaining the thresholds, which is not limited to the conventional method, may use deep learning or machine learning.

The method provided by the embodiments of the present application is not limited to H.265, and may also be applied to other video coding standards, such as H.264, H.266, Alliance for Open Medium Video (AV) 1, VP8, VP9, Audio Video coding Standard (AVS) 2 and AVS3.

An embodiment of the present application provides a coding management device based on HEVC, the coding management device includes a processor and a memory. The memory stores a computer program which, when called by the processor, causes the processor to perform any of the aforementioned methods.

By obtaining calculated correlation result of a HEVC basic unit before and after the division and judging whether or not to perform the division on the basic unit according to the calculated correlation result, the device provided by the embodiments of the present application decreases the complexity of the judgment with the correlation result of the basic unit before and after the division as a division decision condition.

All or some of the steps in the methods and the functional modules/units in the system and the device disclosed above may be implemented as software, firmware, hardware and an appropriate combination of software, firmware and hardware. In the hardware implementation, the division between the functional modules/units mentioned in the above description does not necessarily correspond to the division of physical components. For example, a physical component may have multiple functions, or a function or a step may be cooperatively executed by multiple physical components. Some or all of the components may be implemented as software executed by a processor (such as a digital signal processor or a microprocessor), hardware or an integrated circuit (such as an application-specific integrated circuit). Such software may be distributed on a computer-readable medium, which may include computer storage medium (or non-transitory medium) and communication medium (or transitory medium). The term "computer storage medium" includes volatile and nonvolatile, removable and non-removable medium implemented in any method or technique for storing information (such as computer-readable instructions, data structures, program modules or other data). Computer storage medium includes but is not limited to random access memory (RAM), read-only memory (ROM), electrically erasable programmable read-only memory (EEPROM), flash memory or other memory technologies, CD-ROM, digital versatile disc (DVD) or other optical disk storage, magnetic cassette, magnetic tape, magnetic disk storage or other magnetic storage device or any other medium that can be used to store desired information and can be accessed by a computer. Communication medium typically contains computer-readable instructions, data structures, program modules or other data in modulated data signals such as carriers or other transmission mechanisms, and may include any information delivery medium.

The invention claimed is:

1. A coding management method based on high efficiency video coding (HEVC), comprising:
   obtaining a calculated correlation result for a HEVC basic unit before and after division, the correlation result comprising spatial correlation $\alpha_s$ between the basic unit before the division and the N basic units generated after the division, and spatial correlation $\beta_s$ between the N basic units generated after the division of the basic unit, and N being an integer greater than 1; and
   judging whether or not to perform the division on the basic unit according to the calculated correlation result.

2. The method of claim 1, wherein:
   $\alpha_s$ is obtained by the following formula:

$$\alpha_s = \frac{N * D(X)^d}{D(X)_1^{d+1} + D(X)_2^{d+1} + D(X)_3^{d+1} + \ldots + D(X)_N^{d+1}};$$

wherein N denotes a total number of the basic units generated after the division; d denotes a depth before the division of the basic unit; d+1 denotes a depth after the division of the basic unit; $D(X)^d$ denotes a spatial correlation degree before the division of the basic unit; and $D(X)_i^{d+1}$ denotes a spatial correlation degree of the ith basic unit generated after the division of the basic unit, and i=1, 2, 3, . . . , N; and $\beta_s$ is obtained by the following formula:

$$\beta_s = \frac{\max(D(X)_1^{d+1}, D(X)_2^{d+1}, D(X)_3^{d+1}, \ldots, D(X)_N^{d+1})}{\min(D(X)_1^{d+1}, D(X)_2^{d+1}, D(X)_3^{d+1}, \ldots, D(X)_N^{d+1})};$$

wherein N denotes a total number of the basic units generated after the division; d denotes a depth before the division of the basic unit; d+1 denotes a depth after the division of the basic unit; $D(X)^d$ denotes a spatial correlation degree before the division of the basic unit; and $D(X)_i^{d+1}$ denotes a spatial correlation degree of the ith basic unit generated after the division of the basic unit, and i=1, 2, 3, . . . , N.

3. The method of claim 1, wherein the calculated correlation result further comprises: a temporal correlation result of the basic unit before the division and the N basic units generated after the division.

4. The method of claim 3, wherein the temporal correlation result comprises at least one of:
temporal correlation $\alpha_t$ between the basic unit before the division and the N basic units generated after the division; and
temporal correlation $\beta_t$ between the N basic units generated after the division of the basic unit.

5. The method of claim 4, wherein:
$\alpha_t$ is obtained by the following formula:

$$\alpha_t = \frac{N*D(Y)^d}{D(Y)_1^{d+1} + D(Y)_2^{d+1} + D(Y)_3^{d+1} + \ldots + D(Y)_N^{d+1}};$$

wherein N denotes a total number of the basic units generated after the division; d denotes a depth before the division of the basic unit; d+1 denotes a depth after the division of the basic unit; $D(Y)^d$ denotes a temporal correlation degree before the division of the basic unit; and $D(Y)_i^{d+1}$ denotes a temporal correlation degree of the ith basic unit generated after the division of the basic unit, and i=1, 2, 3, . . . , N; and
$\beta_t$ is obtained by the following formula:

$$\beta_t = \frac{\max(D(Y)_1^{d+1}, D(Y)_2^{d+1}, D(Y)_3^{d+1}, \ldots, D(Y)_N^{d+1})}{\min(D(Y)_1^{d+1}, D(Y)_2^{d+1}, D(Y)_3^{d+1}, \ldots, D(Y)_N^{d+1})};$$

wherein N denotes a total number of the basic units generated after the division; d denotes a depth before the division of the basic unit; d+1 denotes a depth after the division of the basic unit; and $D(Y)^d$ denotes a temporal correlation degree before the division of the basic unit; and $D(Y)_i^{d+1}$ denotes a temporal correlation degree of the ith basic unit generated after the division of the basic unit, and i=1, 2, 3, . . . , N.

6. The method of claim 3, wherein the judging whether or not to perform the division on the basic unit according to the calculated correlation result comprises:
acquiring a video frame type corresponding to the basic unit;
judging whether or not to perform the division on the basic unit according to the calculated correlation result in response to the video frame type corresponding to the basic unit being an intra-frame video frame; and
judging whether or not to perform the division on the basic unit according to the spatial correlation result and the temporal correlation result in response to the video frame type corresponding to the basic unit being an unidirectionally predictively coded frame or a bidirectionally predictively coded frame.

7. The method of claim 6, wherein the judging whether or not to perform the division on the basic unit according to the calculated correlation result comprises:
judging whether or not to perform the division on the basic unit according to a spatial correlation degree of the basic unit before the division in response to the video frame type corresponding to the basic unit being an intra-frame video frame; and
judging whether or not to perform the division on the basic unit according to the spatial correlation degree and a temporal correlation degree before the division of the basic unit in response to the video frame type corresponding to the basic unit being an unidirectionally predictively coded frame or a bidirectionally predictively coded frame.

8. The method of claim 7, after the judging whether or not to perform the division on the basic unit according to the calculated correlation result, the method further comprising:
collecting statistics on the correlation result of the basic unit undergoing the division and the correlation result of the basic unit not undergoing the division after a result of judging whether or not to perform the division on the basic unit is obtained; and
determining a threshold used in an execution of a next judgment on whether or not to perform the division on the basic unit according to the correlation result of the basic unit undergoing the division and the correlation result of the basic unit not undergoing division, wherein the threshold comprise at least one of a threshold for performing the division and a threshold for not performing the division.

9. The method of claim 1, after the judging whether or not to perform the division on the basic unit according to the calculated correlation result, the method further comprising:
calculating residual information of the basic unit after determining not to perform the division on the basic unit; and
performing the division on the basic unit in response to the obtained residual information meeting a preset residual judgment condition.

10. A coding management device based on high efficiency video coding (HEVC), comprising a processor and a memory, wherein the memory stores a computer program which, when called by the processor, causes the processor to perform a coding management method based on HEVC comprising:
obtaining a calculated correlation result for a HEVC basic unit before and after division, the correlation result comprising spatial correlation $\alpha_s$ between the basic unit before the division and the N basic units generated after the division, and spatial correlation $\beta_s$ between the N basic units generated after the division of the basic unit, and N being an integer greater than 1; and
judging whether or not to perform the division on the basic unit according to the calculated correlation result.

11. The device of claim 10, wherein:
$\alpha_s$ is obtained by the following formula:

$$\alpha_s = \frac{N*D(X)^d}{D(X)_1^{d+1} + D(X)_2^{d+1} + D(X)_3^{d+1} + \ldots + D(X)_N^{d+1}};$$

wherein N denotes a total number of the basic units generated after the division; d denotes a depth before the division of the basic unit; d+1 denotes a depth after the division of the basic unit; $D(X)^d$ denotes a spatial correlation degree before the division of the basic unit; and $D(X)_i^{d+1}$ denotes a spatial correlation degree of the ith basic unit generated after the division of the basic unit, and i=1, 2, 3, . . . , N; and $\beta_s$ is obtained by the following formula:

$$\beta_s = \frac{\max(D(X)_1^{d+1}, D(X)_2^{d+1}, D(X)_3^{d+1}, \ldots, D(X)_N^{d+1})}{\min(D(X)_1^{d+1}, D(X)_2^{d+1}, D(X)_3^{d+1}, \ldots, D(X)_N^{d+1})};$$

wherein N denotes a total number of the basic units generated after the division; d denotes a depth before the division of the basic unit; d+1 denotes a depth after the division of the basic unit; $D(X)^d$ denotes a spatial correlation degree before the division of the basic unit; and $D(X)_i^{d+1}$ denotes a spatial correlation degree of the ith basic unit generated after the division of the basic unit, and i=1, 2, 3, . . . , N.

12. The device of claim 10, wherein the calculated correlation result further comprises:
 a temporal correlation result of the basic unit before the division and the N basic units generated after the division.

13. The device of claim 12, wherein the temporal correlation result comprises at least one of:
 temporal correlation $\alpha_t$ between the basic unit before the division and the N basic units generated after the division; and
 temporal correlation $\beta_t$ between the N basic units generated after the division of the basic unit.

14. The device of claim 13, wherein:
 $\alpha_t$ is obtained by the following formula:

$$\alpha_t = \frac{N * D(Y)^d}{D(Y)_1^{d+1} + D(Y)_2^{d+1} + D(Y)_3^{d+1} + \ldots + D(Y)_N^{d+1}};$$

wherein N denotes a total number of the basic units generated after the division; d denotes a depth before the division of the basic unit; d+1 denotes a depth after the division of the basic unit; and $D(Y)^d$ denotes a temporal correlation degree before the division of the basic unit; and $D(Y)_i^{d+1}$ denotes a temporal correlation degree of the ith basic unit generated after the division of the basic unit, and i=1, 2, 3, . . . , N; and $\beta_t$ is obtained by the following formula:

$$\beta_t = \frac{\max(D(Y)_1^{d+1}, D(Y)_2^{d+1} D(Y)_3^{d+1}, \ldots, D(Y)_N^{d+1})}{\min(D(Y)_1^{d+1}, D(Y)_2^{d+1}, D(Y)_3^{d+1}, \ldots, D(Y)_N^{d+1})};$$

wherein N denotes a total number of the basic units generated after denotes a depth after the division of the basic unit; and $D(Y)^d$ denotes a temporal correlation degree before the division of the basic unit; and $D(Y)_i^{d+1}$ denotes a temporal correlation degree of the ith basic unit generated after the division of the basic unit, and i=1, 2, 3, . . . , N.

15. The device of claim 12, wherein the judging whether or not to perform the division on the basic unit according to the calculated correlation result comprises:
 acquiring a video frame type corresponding to the basic unit;
 judging whether or not to perform the division on the basic unit according to the calculated correlation result in response to the video frame type corresponding to the basic unit being an intra-frame video frame; and
 judging whether or not to perform the division on the basic unit according to the spatial correlation result and the temporal correlation result in response to the video frame type corresponding to the basic unit being an unidirectionally predictively coded frame or a bidirectionally predictively coded frame.

16. The device of claim 15, wherein the judging whether or not to perform the division on the basic unit according to the calculated correlation result comprises:
 judging whether or not to perform the division on the basic unit according to a spatial correlation degree of the basic unit before the division in response to the video frame type corresponding to the basic unit being an intra-frame video frame; and
 judging whether or not to perform the division on the basic unit according to the spatial correlation degree and a temporal correlation degree before the division of the basic unit in response to the video frame type corresponding to the basic unit being an unidirectionally predictively coded frame or a bidirectionally predictively coded frame.

17. The device of claim 16, after the judging whether or not to perform the division on the basic unit according to the calculated correlation result, the method further comprising:
 collecting statistics on the correlation result of the basic unit undergoing the division and the correlation result of the basic unit not undergoing the division after a result of judging whether or not to perform the division on the basic unit is obtained; and
 determining a threshold used in an execution of a next judgment on whether or not to perform the division on the basic unit according to the correlation result of the basic unit undergoing the division and the correlation result of the basic unit not undergoing division, wherein the threshold comprise at least one of a threshold for performing the division and a threshold for not performing the division.

18. The device of claim 10, after the judging whether or not to perform the division on the basic unit according to the calculated correlation result, the method further comprising:
 calculating residual information of the basic unit after determining not to perform the division on the basic unit; and
 performing the division on the basic unit in response to the obtained residual information meeting a preset residual judgment condition.

* * * * *